United States Patent
Levy et al.

(10) Patent No.: US 9,923,813 B2
(45) Date of Patent: Mar. 20, 2018

(54) INCREASING PACKET PROCESSING RATE IN A NETWORK DEVICE

(71) Applicant: Marvell World Trade Ltd., St. Michael (BB)

(72) Inventors: Gil Levy, Hod Hasharon (IL); Amir Roitshtein, Holon (IL); Rami Zemach, Givat Shapira (IL)

(73) Assignee: MARVELL WORLD TRADE LTD., St. Michael (BB)

(*) Notice: Subject to any disclaimer, the term of this patent is extended or adjusted under 35 U.S.C. 154(b) by 0 days.

(21) Appl. No.: 14/574,088

(22) Filed: Dec. 17, 2014

(65) Prior Publication Data
US 2015/0172187 A1 Jun. 18, 2015

Related U.S. Application Data

(60) Provisional application No. 61/917,809, filed on Dec. 18, 2013.

(51) Int. Cl.
*H04L 12/741* (2013.01)
*H04L 29/06* (2006.01)
(Continued)

(52) U.S. Cl.
CPC .............. *H04L 45/74* (2013.01); *H04L 47/10* (2013.01); *H04L 49/251* (2013.01);
(Continued)

(58) Field of Classification Search
CPC ..... H04L 45/74; H04L 49/3009; H04L 49/30; H04L 49/70; H04L 49/10; H04L 49/101
(Continued)

(56) References Cited

U.S. PATENT DOCUMENTS 7,212,530 B1 * 5/2007 Lim .................... H04L 49/3009
370/392
7,724,684 B2 * 5/2010 Cassod .................. H04L 41/22
370/238
(Continued)

FOREIGN PATENT DOCUMENTS

EP 1775908 4/2007
WO WO-99/07180 A2 2/1999

OTHER PUBLICATIONS

Shpiner et al., "Reducing the Reordering Delay in Multi-Core Network Processors," Technical Report TR12-01, Comnet, Technion, Israel.
(Continued)

*Primary Examiner* — Kwang B Yao
*Assistant Examiner* — Syed M Bokhari

(57) ABSTRACT

In a method for processing packets in a network device, a first packet is received at a first port of the network device. A first set of bits, corresponding to a first set of bit locations in a header of the first packet, is extracted from the header of the first packet. A first set of processing operations is performed to process the first packet using the first set of bits. A second packet is received at a second port of the network device. A second set of bits, corresponding to a second set of bit locations in a header of the second packet, is extracted from the header of the second packet. A second set of processing operations is performed to process the second packet using the second set of bits.

14 Claims, 7 Drawing Sheets

(51) Int. Cl.
  *H04L 12/947* (2013.01)
  *H04L 12/931* (2013.01)
  *H04L 12/935* (2013.01)
  *H04L 12/801* (2013.01)

(52) U.S. Cl.
  CPC .......... *H04L 49/3009* (2013.01); *H04L 49/70* (2013.01); *H04L 69/22* (2013.01)

(58) Field of Classification Search
  USPC ................................ 370/389, 392, 413, 400
  See application file for complete search history.

(56) References Cited

U.S. PATENT DOCUMENTS

| | | | |
|---|---|---|---|
| 7,924,860 B1* | 4/2011 | Frailong | H04L 49/552 370/413 |
| 8,111,690 B2 | 2/2012 | Hussain et al. | |
| 2002/0001311 A1* | 1/2002 | Lizin | H04L 49/3009 370/392 |
| 2004/0136368 A1* | 7/2004 | Wakayama | H04L 29/06 370/389 |
| 2004/0179509 A1 | 9/2004 | Lev et al. | |
| 2008/0114887 A1 | 5/2008 | Bryers et al. | |
| 2008/0151909 A1* | 6/2008 | Scott | G06F 11/0781 370/400 |
| 2012/0147892 A1 | 6/2012 | Basso et al. | |
| 2012/0177047 A1 | 7/2012 | Roitshtein | |
| 2013/0254421 A1 | 9/2013 | Mondaeev et al. | |
| 2014/0122743 A1 | 5/2014 | Di Benedetto et al. | |
| 2014/0169378 A1 | 6/2014 | Shumsky et al. | |
| 2014/0177470 A1 | 6/2014 | Roitshtein et al. | |
| 2014/0192815 A1 | 7/2014 | Shumsky et al. | |
| 2014/0286352 A1 | 9/2014 | Turgeman et al. | |
| 2015/0056991 A1 | 2/2015 | Seth | |
| 2015/0092778 A1* | 4/2015 | Jackson | H04L 67/2842 370/392 |
| 2015/0113190 A1 | 4/2015 | Wohlgemuth et al. | |
| 2015/0172188 A1 | 6/2015 | Levy et al. | |

OTHER PUBLICATIONS

U.S. Appl. No. 14/092,521, filed Nov. 27, 2013.
U.S. Appl. No. 14/482,980, filed Sep. 10, 2014.
U.S. Appl. No. 14/516,529, filed Oct. 16, 2014.
U.S. Appl. No. 14/516,500, filed Oct. 16, 2014.
U.S. Appl. No. 14/515,363, filed Oct. 15, 2014.
U.S. Appl. No. 14/610,834, Levy et al., "Packet Distribution with Prefetch in a Parallel Processing Network Device," filed Jan. 30, 2015.
International Search Report and Written Opinion in International Application No. PCT/IB2014/067053, dated Jul. 7, 2015 (20 pages).
McKeown, et al., "OpenFlow: Enabling Innovation in Camput Networks," *ACM Sigcomm Computer Communication Review*, vol. 38, No. 2, pp. 69-74 (Apr. 2008).
Office Action in U.S. Appl. No. 14/574,214, dated Sep. 8, 2016 (20 pages).
Office Action in U.S. Appl. No. 14/574,214, dated Apr. 14, 2017 (13 pages).
International Preliminary Report on Patentability in International Application No. PCT/IB2014/067053, dated Jun. 21, 2016 (15 pages).
Communication pursuant to Article 94(3) EPC in International Patent Application No. 14833470.9, dated Jan. 19, 2018 (14 pages).
"Multiprotocol Label Switching," Wikipedia entry accessed Dec. 19, 2017, pp. 1-5 (Dec. 15, 2013).
Proceedings of the Seventh ACM Workshop on Hot Topics in Networks (HotNets-VII), SIGCOMM Conference, Calgary, Alberta, Canada, pp. 1-132 (Oct. 2008).
Gibb et al., "Design Principles for Packet Parsers," Artchitectures for Networking and Communications Systems (ANCS), IEEE, 12 pages (Oct. 21, 2013).
"Cisco Nexus 5548P Switch Architecture," Cisco White Paper, 14 pages (Dec. 1, 2010).
"How to Configure Tag Switching and MPLS," Cisco Support Community webpage accessed Dec. 19, 2017, 8 pages (Jun. 18, 2009).
"OpenFlow Switch Specification," Open Networking Foundation, Version 1.4.0 (Wire Protocol 0×05), 206 pages (Oct. 14, 2013).

* cited by examiner

INCREASING PACKET PROCESSING RATE IN A NETWORK DEVICE

CROSS-REFERENCES TO RELATED APPLICATIONS

This disclosure claims the benefit of U.S. Provisional Patent Application No. 61/917,809, entitled "Increasing packet processing by packing packet headers," filed on Dec. 18, 2013, which is hereby incorporated by reference in its entirety.

FIELD OF TECHNOLOGY

The present disclosure relates generally to network devices such as network switches, bridges, routers, etc., and more particularly, to packet processing techniques implemented in network devices.

BACKGROUND

A network switch typically includes a plurality of ports coupled to different links. The network switch receives packets from a network and performs various processing operations on the packets, which may include processing operations related to forwarding of the packet through the network device, such as determining a port of the network device to which to direct a packet based on an address in a header of the packet, metering operations performed to account for packets belonging to certain flows, security policy operations, etc.

In some applications, a network device may process packets differently depending on an origin of the packets. For instance, there may be different processing requirements depending on whether packets are received from an external network coupled to a data center, from another device within a data center, or from network devices located in different layers of a data center.

Some network devices process packets using a data path and a control path. The data path generally buffers data for received packets until the packets are transmitted from the network device, while the control path generally performs processing of the packets. Throughput of the data path is measured as a data rate (e.g., bits per second), while throughput of the control path is typically measured as a packet rate (e.g., packets per second). The packet rate of the control path is affected by the data rate and also a size of the packets being processed. For example, for a same data rate of a stream of packets, the packet rate is relatively higher for a first packet size than for a second packet size that is larger than the first packet size. Performance of the network device is generally improved by mitigating various bottlenecks associated with processing of packets by the control path.

SUMMARY

In an embodiment, a method for processing packets in a network device includes receiving a first packet at a first port of the network device, extracting a first set of bits from a header of the first packet, the first set of bits corresponding to a first set of bit locations in the header of the first packet, and performing a first set of processing operations to process the first packet using the first set of bits extracted from the header of the first packet. The method also includes receiving a second packet at a second port of the network device, the second port being different from the first port, extracting a second set of bits from a header of the second packet, the second set of bits corresponding to a second set of bit locations in the header of the second packet, wherein the second set of bit locations includes at least one bit location not included in the first set of bit locations, and performing a second set of processing operations to process the second packet using the second set of bits extracted from the header of the second packet, wherein the second set of processing operations includes at least one processing operation not included in the first set of processing operations.

In another embodiment, a network device comprises a plurality of ports. The network device also comprises a packet descriptor generator configured to generate a first data structure corresponding to a first packet received via a first port of the plurality of ports, wherein the first data structure includes a first set of bits extracted from a header of the first packet, the first set of bits corresponding to a first set of bit locations in the header of the first packet. The packet descriptor is also configured to generate a second data structure corresponding to a second packet received via a second port of the plurality of ports, the second port being different from the first port, wherein the second data structure includes a second set of bits corresponding to a second set of bit locations in the second header, and wherein the second set of bit locations includes at least one bit location not included in the first set of bit locations. The network device also comprises a packet processor configured to perform a first set of processing operations to process the first packet using the first data structure corresponding to the first packet, and perform a second set of processing operations to process the second packet using the second data structure corresponding to the second packet, wherein the second set of processing operations includes at least one processing operations not included in the first set of processing operations.

In yet another embodiment, a method for processing packets in a network device includes receiving a first packet at a port of the network device, the first packet to be processed using a first reduced set of processing operations, and extracting a first set of bits from a header of the first packet. The method also includes receiving a second packet at the port of the network device, the second packet to be processed using a second reduced set of processing operations, and extracting a second set of bits from a header of the second packet. The method additionally includes combining the first set of bits and the second set of bits into a combined single data unit representing the first packet and the second packet, and transferring the combined single data unit representing the first packet and the second packet to a packet processing device. The method further includes decomposing, at the packet processing device, the single data unit to extract the first set of bits corresponding to the first packet and the second set of bits corresponding to the second packet, performing the first reduced set of processing operations to process the first packet using the first set of bits corresponding to the first packet, and performing the second reduced set of processing operations to process the second packet using the second set of bits corresponding to the second packet.

In still another embodiment, a network device comprises a plurality of ports. The network device also comprises a packet processing device configured to process packets received via the at least one port. The network device further comprises a descriptor generator configured to extract a first set of bits from a header of a first packet received at a port of the plurality of ports, the first packet to be processed using a reduced set of processing operations, and extract a second set of bits from a header of a second packet received at the port of the plurality of ports, the second packet to be processed using a second reduced set of processing operations. The descriptor generator is additionally configured to combine the first set of bits and the second set of bits into a combined single data unit representing the first packet and the second packet, and transfer the combined single data unit representing the first packet and the second packet to the packet processing device. The packet processing device is configured to decompose the combined single data unit to extract the first set of bits corresponding to the first packet and the second set of bits corresponding to the second packet, perform the first reduced set of instructions to process the first packet using the first set of bits corresponding to the first packet, and perform the second reduced set of processing operations to process the second packet using the second set of bits corresponding to the second packet.

DETAILED DESCRIPTION

Figure 1:
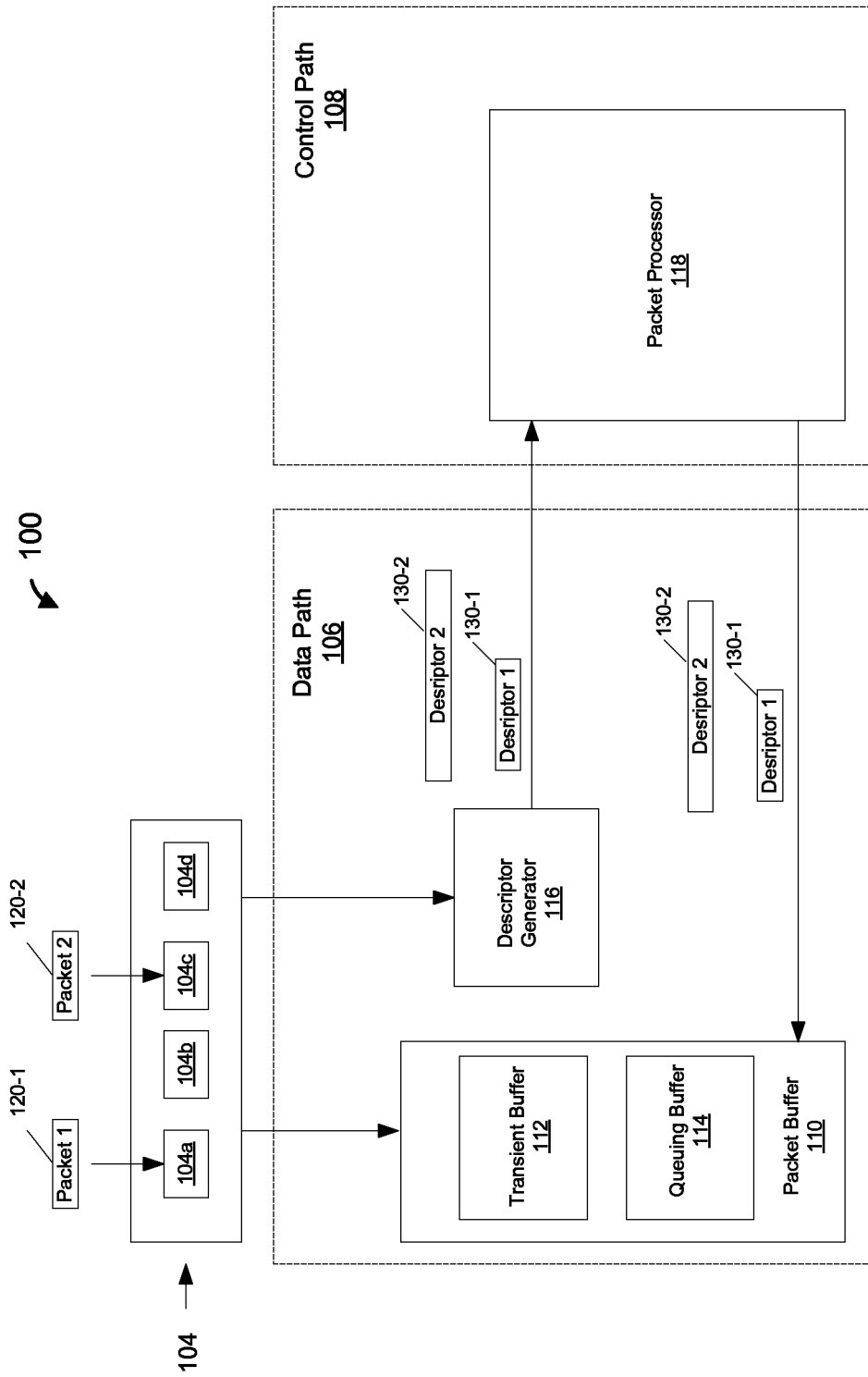
FIG. 1 is a block diagram of an example network device configured to perform different sets of processing operations on different packets that enter the network device 100, according to an embodiment.

In embodiments disclosed herein, a network device is configured to perform different sets of processing operations on different packets entering the network device. In an embodiment, the network device is configured to perform different sets of processing operations on packets that enter the network device via different ports of the network device. For example, the network device is configured to perform a first set of processing operations on packets that enter the network device via a first port of the network device, and perform a second set of processing operations on packets that enter the network deice via a second port of the network device.

In an embodiment, the first set of processing operations is a "full" set of processing operations that the network device is configured to perform to fully process a packet, and the second set of processing operations is a reduced set that includes only a subset of processing operations that the network device is configured to perform to fully process the packet. For example, in an embodiment, the reduced set of processing operations includes only processing operations related to forwarding of packets, while the full set of processing operations includes at least one additional processing operation in addition to processing operations related to forwarding of packets, such as processing operations related to metering of packets flowing through the network device, processing operations related to security policy applied to packets entering the network device, processing operations related to metering to count packets belonging to different data flows, etc. In another embodiment, the first set of processing operations and the second set of processing operations are both reduced sets of processing operations, wherein the first set of processing operations and the second set of processing operations include different subsets of a full set of processing operations that the network device is configured to perform.

In some embodiments, the network device is configured to extract, from headers of packets, different sets of bits depending on the different processing operations that are to be performed with respect to the packets by the network device. For example, the network device is configured to extract a reduced set of bits from a header of a packet that is to be processed using a reduced set of processing operations as compared to a full set of bits that the network device is configured to extract from a header of a packet that is to be processed using a full set of processing operations. In some embodiments, the network device is configured to combine two or more reduced sets of bits extracted from respective two or more consecutively received packets into a combined single data unit representing the two or more packets, and to transmit the extracted reduced sets of bits as a single data unit to various processing components of the network device. As will be described in more detail below, combining multiple reduced sets of bits extracted from multiple packets into a combined single data unit and transferring the single data unit to various processing components of the network device allows the processing components to more quickly perform at least some operations with respect to the packets, thereby allowing the network device to process the packets more quickly compared to systems in which header information associated with each packet is individually routed through the network device, in at least some embodiments.

FIG. 1 is a block diagram of an example network device 100 configured to perform different sets of processing operations on different packets that enter the network device 100, according to an embodiment. The network device 100 includes a plurality of ports 104 communicatively coupled to a plurality of links (not shown). In an embodiment, some of the ports 104 are front ports or network ports that are utilized for coupling to local area networks (LANs), wide area networks (WANs), servers, other switching systems, etc. Other ports 104 are uplink ports that are utilized to couple the network device 100 to one or more other devices, such as one or more second stage or crossbar devices, one or more spine switch devices, etc., in a modular topology of a switching system that includes the network device 100, in an embodiment. Although four ports 104 are illustrated in FIG. 1, the network device 100 includes any suitable number of ports 104 in various embodiments.

In some embodiments, each of the ports 104 is a bidirectional port that can act as either an ingress port or an egress port. In other embodiments, at least some of the ports 104 are dedicated to be either ingress ports or egress ports. In an embodiment, the network device 100 is configured to receive packets via ingress ports 104, to determine respective egress ports 104 via which the packets are to be transmitted, and to transmit the packets via the determined ports 104. In an embodiment, the network device 100 is configured to implement additional processing operations with respect to at least some of the packets that enter the network device 100. For example, the network device 100 is configured to implement processing operations related to metering of packets that enter the network device, counting operations to determine byte counts of packets flowing through the network device 100, processing operations related to applying security policies to packets flowing through the network device, applying access control policies to packets entering the network device 100, tunneling processing operations, etc. In an embodiment, the network device 100 is configured to perform different sets of processing operations on packets that enter the network device 100 via different ports 104. For example, the network device 100 is configured to implement a different set of processing operation with respect to packets that the network device 100 receives from a network via a network port 104 as compared to packets that enter the network device 100 receives via an uplink port 104 from another network device in a switching system that includes the network device 100, in an embodiment.

Referring still to FIG. 1, the network device 100 comprises a data path 106 and a control path 108. In an embodiment, the data path 106 comprises various components for storing packets received via ingress ports 104, for example until it is determined via which one or more ports 104 the packets should be transmitted from the network device 100. On the other hand, the control path 108 includes various components for processing of the packets, for example for determining the egress ports 104 via which to transmit the packets.

Generally speaking, components of the data path 106 are configured to support a certain bit per second rate (also referred to herein as line rate) of packets received via the ports 104, or the number of bits (or bytes) in a given period of time that can be handled by the components of the data path 106, in an embodiment. On the other hand, components of the control path 108 are configured to support a certain packet per second rate, or a certain number of packets that the components of the control path 106 can process in a certain period of time, in an embodiment. In at least some embodiments, the network device 100 supports packets of variable lengths, such as, for example, Ethernet packets of variable lengths. The bit per second rate that the data path 106 needs to support is generally not affected by the lengths of the packets received by the network device 100, in an embodiment. On the other hand, the packet per second rate that the control path 108 needs to support can vary depending on size of the received packets. For example, a stream of relatively smaller sized packets received by the network device 100 increases the number of packets that the control path needs to process in a certain period of time as compared to processing of streams of larger sized packets, in an embodiment.

In an embodiment, to speed up processing of at least some of the packets received by the network device 100, the network device 100 implements reduced sets of processing operations with respect to the least some packets received by the network device 100. For example, as described above, the network device 100 is configured to implement reduced sets of processing operations with respect to packets that enter the network device 100 via certain ingress ports 104 of the network device 100, such as packets that enter the network device 100 via uplink ports 104 that connect the network device 100 to other devices internal to the data center that includes the network device 100.

In an embodiment, the control path 108 is configured to perform processing of packets based on certain information associated with the packets, such as certain header fields extracted from headers of the packets. The data path 106 is configured to extract a set of bits from a header of a packet, and to provide the extracted set of bits to the control path 108 for processing of the packet, in an embodiment. The control path 108 is configured to receive the set of bits, extracted from a header of a packet, from the data path 106 and to perform processing of the packet using on the bits received from the data path 106, in an embodiment. In an embodiment, when the network device 100 receives a packet that is to be processed using a reduced set of processing operations, the data path 106 extracts a reduced set of bits from the header of the packet, and provides the reduced set of bits to the control path 108. In an embodiment, the reduced set of bits consists of bits that are needed by the control path 108 to perform the reduced set of processing operations on the packet.

The data path 106 includes a packet buffer 110 coupled to the ports 104 and configured to store packets received via ingress ports 104, for example while the packets await transmission via egress ports 104. In an embodiment, the buffer 110 includes a transient buffer 112 and a queuing, or target-aware, buffer 114, in an embodiment. Each of the transient buffer 112 and the queuing buffer 114 is implemented as a suitable non-transitory memory device such as a random access memory (RAM), or another suitable type of memory, in various embodiments. In another embodiment, the transient buffer 112 and the queuing buffer 114 are included in a same non-transitory memory device such as a random access memory (RAM), or another suitable type of memory. In an embodiment, the transient buffer 112 is configured to store a packet, or a portion thereof, while a header of the packet, or other suitable data structure representing the packet, is processed (e.g., to determine a target egress port for the packet, perform various operations such as time keeping, perform various security and inspection operations and the like). In an embodiment, packets are stored in the transient buffer 112 for a period of time generally corresponding to a period of time required to complete processing of a packet. In an embodiment, for "store and forward" packets, after processing of the packet is completed, the packet is transferred to the queuing buffer 114, and is scheduled for transmission from the queuing buffer 114. On the other hand, in case of a "cut-through" packet, the packet is not transferred to the queuing buffer 114, but is transmitted directly from the transient buffer 112, in an embodiment.

A descriptor generator 116 coupled to the ports 104 is configured to parse headers of packets received via the ports 104 and to extract sets of bits from the headers of the packets (e.g., to extract certain header fields), in an embodiment. In an embodiment, the descriptor generator 116 is configured to extract different sets of bits from packets depending on via which ones of the ingress port 104 the packets were received by the network device 100. For example, in an embodiment in which the network device 100 is configured to process packets received via different ingress ports 104 using different sets of processing operations, the descriptor generator 116 is configured to extract, from headers of packets received via different ports 104, different sets of bits that are needed for performing the different sets of processing operations. In an embodiment, the descriptor generator 116 is configured to generate a packet descriptor, or another suitable data structure, corresponding to a packet, and to include a set of bits extracted from a header of the packet in the packet descriptor corresponding to the packet.

The control path 108 includes a packet processor 118, in an embodiment. In an embodiment, the packet processor 118 includes one or more tangible/physical processors configured to perform various packet processing tasks such as those discussed above. In a first illustrative embodiment, the packet processor 118 includes one or more processors configured to read and execute software and/or firmware instructions stored on a tangible, non-transitory, computer-readable memory (e.g., a random access memory (RAM), a read-only memory (ROM), a FLASH memory, etc.), the processors being configured to execute the instructions to perform packet processing operations. In some embodiments, the software or firmware instructions include computer-readable instructions that, when executed by the processor(s), cause the processor(s) to perform any of the various actions of packet processor 118 described herein. In some embodiments, the processors of the packet processor 118 are coupled to one or more hardware engines that are utilized by the processors to offload certain packet processing tasks. In another illustrative embodiment, the packet processor 118 comprises a packet processing pipeline implemented in hardware, such as one or more integrated circuits (ICs), application-specific integrated circuits (ASICs), or any other suitable type(s) of hardware circuit(s).

In the example embodiment and scenario, the network device 100 receives a first packet 120-1 via a port 104a. The network device 100 is configured to process packets that enter the network device 100 via the port 104a using a first set of packet processing operations, in an embodiment. In an embodiment, the first set of packet processing operations is a reduced set of processing operations. For example, the first set of processing operations does not include all packet processing operations that the network device 100 is configured to perform. As just an example, whereas the network device 100 is configured to perform processing operations related to forwarding, metering, monitoring, security, etc., the first set of processing operations includes only processing operations related to forwarding, and does not include processing operations related to metering, monitoring, security, etc., in an embodiment. As another example, whereas the network device 100 is configured to perform processing operations related to forwarding, metering, monitoring, security, etc., the first set of processing operations includes only processing operations related to forwarding and metering, and does not include processing operations related to monitoring, security, etc., in an embodiment.

At least a portion of the first packet 120-1, such as at least a header of the packet 120-1, is provided to the descriptor generator 116. The packet descriptor generator 116 extracts a first set of bits from the header of the first packet 120-1, in an embodiment. In an embodiment, the first set of bits corresponds to a first set of bit locations in the header of the first packet 120-1, such as bit locations corresponding to a first set of header fields in the header of the first packet 120-1. In an embodiment, the packet descriptor generator 116 extracts first n bits from the header of the first packet 120-1, wherein n is a positive integer. For example, the packet descriptor generator 116 extracts the first 64 bits, the first 128 bits, etc., from the header of the first packet 120-1, in some embodiments. In an embodiment, the descriptor generator 116 generates a packet descriptor 130-1 corresponding to the packet 120-1, and includes the set of bits extracted from the header of the packet 120-1 in the descriptor 130-1.

Continuing with the embodiment and scenario illustrated in FIG. 1, the network device 100 receives a second packet 120-2 via a port 104c. The network device 100 is configured to process packets that enter the network device 100 via the port 104c using a second set of packet processing operations, in an embodiment. In an embodiment, the second set of packet processing operations that the network device 100 is configured to perform on packets that enter the network device 100 via the ports 104c is a different set of processing operations compared to the first set of processing operations that the network device 100 is configured to perform on packets that enter the network device 100 via the port 104a. In an embodiment, the second set of processing operations includes at least one processing operation not included in the first set of processing operations. In an embodiment, the second set of processing operation is a full set of processing operations that includes all processing operations that the network device 100 is configured to perform. For example, the second set of processing operations includes processing operations related to forwarding, metering, monitoring, security, etc., in an embodiment.

In another embodiment, the second set of processing operations that the network device 100 is configured to perform on packets that enter the network device 100 via the port 104c includes only a subset of the full set of processing operation that the network device 100 is generally configured to perform. In an embodiment, the subset of processing operations that the network device 100 is configured to perform on packets that enter the network device 100 via the port 104c is different from the subset of processing operations that the network device 100 is configured to perform on packets that enter the network device 100 via the port 104a. As just an example, whereas a full set of processing operations includes processing operations related to related to forwarding, metering, monitoring, security, etc., the first set of processing operations that the network device 100 is configured to perform on packets that enter the network device 100 via the port 104a includes only processing operations related to forwarding of packets, and the second set of processing operations that the network device 100 is configured to perform with respect to packets received via the port 104c includes processing operations related to forwarding of packets and counting of packet bytes, in an example embodiment.

At least a portion of the packet 120-2, such as at least a header of the packet 120-2, is provided to the descriptor generator 116. The packet descriptor generator 116 extracts a second set of bits from the header of the second packet 120-2, in an embodiment. In an embodiment, the second set of bits extracted by the descriptor generator 116 from the second packet 120-2 is different from the first set of bits extracted by the packet descriptor generator 116 from the header of the first packet 120-1. In an embodiment, the second set of bits extracted by the descriptor generator 116 from the second packet 120-2 corresponds to a different set of bits locations in the header of the second packet compared to the bit locations corresponding to the first set of bits extracted from the header of the first packet 120-1. In an embodiment, the descriptor generator 116 extracts a set of header fields from the header of the second packet 120-2 that is different from a set of header fields extracted by the descriptor generator 116 from the header of the first packet 120-1.

In an embodiment, the packet descriptor generator 116 extracts first m bits from the header of the second packet 120-2, wherein m is a positive integer. In an embodiment, the descriptor generator 116 extracts, from the header of the second packet 120-2, a greater number of bits compared to the number of bits that the descriptor generator 116 extracts from the header of the first packet 120-1 (e.g., m>n). For example, whereas the packet generator 116 extracts the first 64 bits from the header of the first packet 120-1, the packet generator 116 extracts the first 128 or the first 256 bits from the header of the second packet 120-2, in an example embodiment. As just another example, whereas the packet generator 116 extracts the first 128 bits from the header of the first packet 120-1, the packet generator 116 extracts the first 256 bits from the header of the second packet 120-2, in another example embodiment.

In an embodiment, the descriptor generator 116 generates a packet descriptor 130-2 corresponding to the second packet 120-2, and includes the set of bits extracted from the header of the second packet 120-2 in the descriptor 130-2. In an embodiment, because the descriptor generator 116 extracts a different number of bits from the header of the second packet 120-2 compared to the number of bits extracted by the descriptor generator 116 from the header of the first packet 120-1, a size of the packet descriptor 130-2 corresponding to the second packet 120-2 is different from a size of the packet descriptor 130-1 corresponding to the first packet 120-1. For example, the packet descriptor 130-2 is half the size of the packet descriptor 130-1, in an embodiment. As another example, the packet descriptor 130-2 is a quarter of the size of the packet descriptor 130-1, in another embodiment.

The packet descriptor 130-1 and the packet descriptor 130-2 is each provided to the packet processor 118, in an embodiment. The packet processor 108 performs processing of the first packer 120-1 and of the second packet 120-2 using information in the packet descriptor 130-1 and in the packet descriptor 130-2, respectively, in an embodiment. In an embodiment, the packet processor 118 performs the first set of processing operations to process the first packet 120-1 using the first set of bits extracted from the header of the first packet 120-1 and included in the packet descriptor 130-1, and performs the second set of processing operations to process the second packet 120-2 using the second set of bits extracted from the header of the first packet 120-2 and included in the packet descriptor 130-2. In an embodiment in which the packet processor 118 comprises one or more processors configured to processes packets using computer readable instructions, the packet processor 118 executes a first set of instructions to process the first packet 120-1, and executes a second set of instructions to process the second packet 120-2. The first set of instructions causes the processor 118 to perform the first set of processing operations, and the second set of instructions causes the processor 118 to perform the second set of processing operations, in an embodiment.

In some embodiments, processing of the first packet 120-1 includes modifying the packet descriptor 130-1, for example to modify one or more fields of the header of the packet 120-1. Similarly, processing of the second packet 120-2 includes modifying the packet descriptor 130-2, for example to modify one or more fields of the header of the packet 120-2, in some embodiments. For example, in an embodiment, the packet processor 118 modifies one or more fields of a header of a packet (e.g., the packet 120-1 and/or the packet 120-2) to change a next hop address, to add an encapsulating header, to remove an encapsulating header, etc.

After processing the first packet 120-1 using the packet descriptor 130-1, the packet processor 118 writes the packet descriptor 130-1, or a modified version of the packet descriptor 1301, to the buffer 110, and the packet 120-1 is subsequently transmitted from one or more appropriate ports 104, in an embodiment. Similarly, after processing the second packet 120-2 using the packet descriptor 130-2, the packet processor 118 writes the packet descriptor 130-2, or a modified version of the packet descriptors 130-2, to the buffer 110, and the packet 120-2 is subsequently transmitted from one or more appropriate ports 104, in an embodiment.

Figure 2:
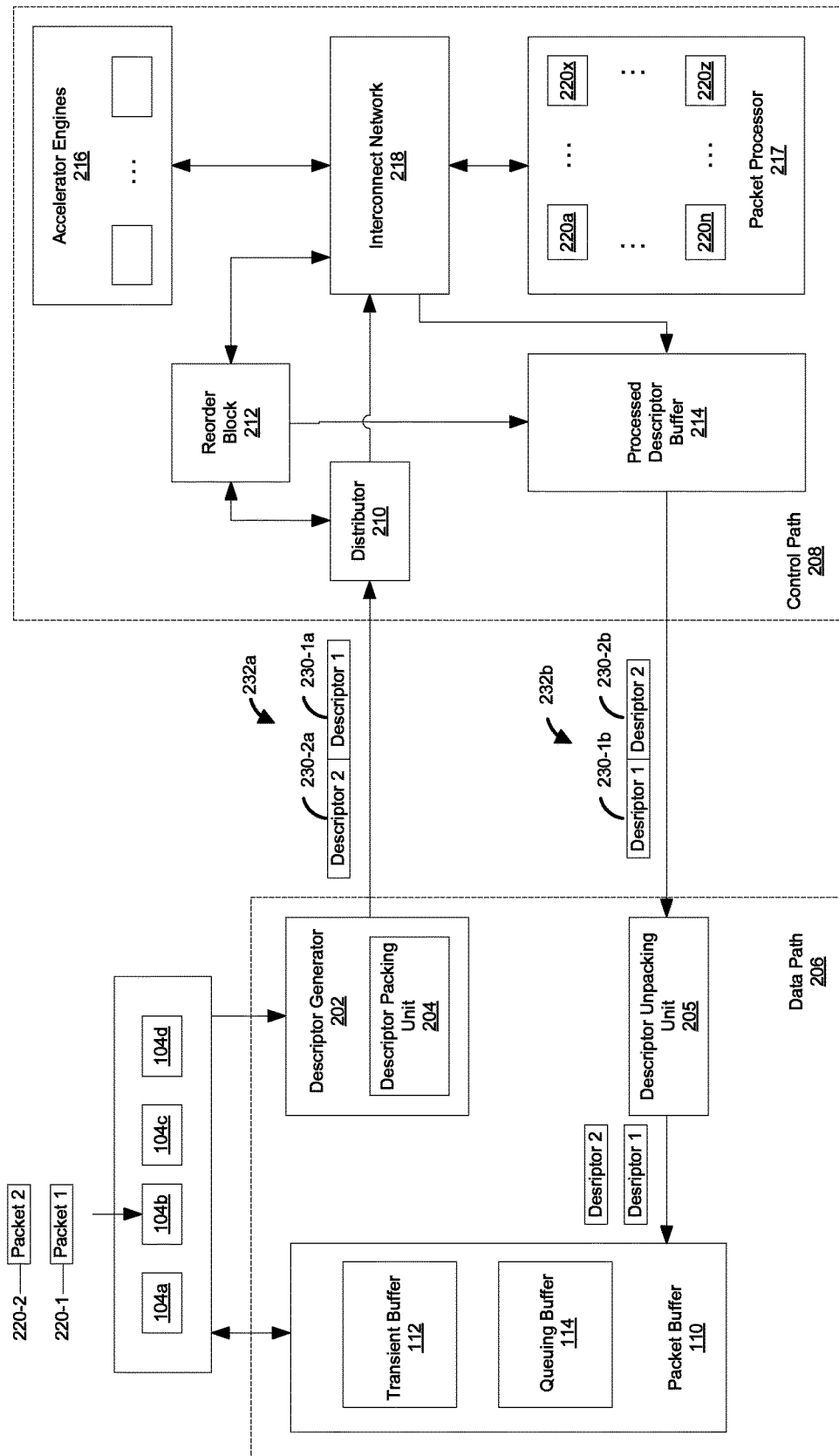
FIG. 2 is a block diagram of an example network device configured to combine header information corresponding to multiple packets, according to an embodiment.

FIG. 2 is a block diagram of another example network device 200, according to an embodiment. The network device 200 is similar to the network device 100 of FIG. 1, in an embodiment. For example, the network device 200 is configured to perform different sets of processing operations on different packets, and to extract different sets of bits from different packets depending on the particular processing operations to be performed with respect to the packets, in an embodiment. Additionally, in an embodiment, the network device 200 is configured to combine reduced sets of bits extracted from headers of multiple packets into a combined single data unit, and provide the reduced sets of bits extracted from respective headers of multiple packets to the control path as a single data unit. As will be described in more detail below, combining sets of bits corresponding to different packets into a combined single data unit, and providing the sets of bits to the control path as a single data unit reduces or eliminates processing bottlenecks associated with increased packet per second processing rate that results from execution of reduced sets of processing operations to process the multiple packets, in at least some embodiments.

The network device 200 includes a data path 206 and a control path 208. The data path 206 includes the packet buffer 110, which in turn includes the transient buffer 112 and the queuing buffer 114, as described above with respect to FIG. 1. Additionally, the data path 206 includes a descriptor generator 202, which in turn includes a descriptor packing unit 204. The descriptor generator 202 is the same as or similar to the descriptor generator 116 of FIG. 1, in an embodiment. Generally speaking, the descriptor generator 202 is configured to extract sets of bits from headers of packets, to include the extracted sets of bits in packet descriptors generated for the packets, and to provide the packet descriptors to the control path 208 for processing of the packets associated with the descriptors by the control path 208, in an embodiment. The descriptor packing unit 204 is configured to combine multiple descriptors, corresponding to multiple packets, into a combined single data unit representing the multiple packets, and to provide the multiple descriptors, as a single data unit, to the control path 208, in an embodiment. For example, in at least some situations in which the descriptor generator 202 extracts reduced sets of bits from headers of multiple consecutively received packets, the descriptor packing unit 204 combines the reduced sets of bits extracted from the multiple packets into combined a single descriptor that represents the multiple packets, and provides the single descriptor to the control path 208, in an embodiment.

In some embodiments, the descriptor packing unit 204 is configured to combine reduced sets of bits (or descriptors that includes the reduced sets of bits) extracted from multiple packets only when one or more criteria for combining sets of bits extracted from multiple packets are met with respect to the multiple packets. For example, in an embodiment, the descriptor packing unit 204 is configured to combine reduced sets of bits extracted from the multiple packets only if respective sizes of the multiple packets are below a threshold, in an embodiment. Similarly, in an embodiment, the descriptor packing unit 204 is configured to combine reduced sets of bits extracted from the multiple packets only if a time gap between reception of respective packets by the network device 200 is below a threshold. If, on the other hand, the one or more criteria for combining sets of bits extracted from multiple packets are not met with respect to the multiple packets, the descriptor packing unit 204 does not combine the sets of bits extracted from the multiple packets, but rather transfers each set of bits (e.g., each descriptor) individually to the control path 208, in an embodiment.

In the example scenario illustrated in FIG. 2, the network device 200 receives a first packet 220-1 via the port 104b. Subsequently, the network device 200 receives a second packet 220-3 via the port 104b. The network device 200 is configured to perform a reduced set of processing operations with respect to packets that enter the network device 100 via the port 104b, in an example embodiment. At least a portion, such as a header, of each of the packets 220-1 and 220-2 is provided to the descriptor generator 202. In an embodiment, the descriptor generator 202 generates a first packet descriptor 230-1a corresponding to the first packet 220-1, and generates a second packet descriptor 230-2a corresponding to the second packet 220-2a. The first packet descriptor 230-1a includes a reduced set of bits extracted from the header of the first packet 220-1, in an embodiment. Similarly, the second packet descriptor 230-2a includes a reduced set of bits extracted from the header of the second packet 220-2, in an embodiment. The descriptor packing unit 204 combines the first packet descriptor 230-1a and the second packet descriptor 230-2a into a single data structure, such as a single "combined" packet descriptor, 232a that represents the first packet 220-1 and the second packet 220-2, in an embodiment. In an embodiment, the descriptor packing unit 204 is configured to include, in the combined packet descriptor 232, an indication (e.g., a "packing flag") to indicate that the combined packet descriptor 232 represents multiple packets and includes respective sets of header bits extracted from the multiple packets. The descriptor generator 202 then transfers the combined packet descriptor 232a, as a single data unit, to the control path 208 for processing of the associated packet 220-1 and packet 220-2 by the control path 208, in an embodiment.

Combining multiple packet descriptors into a single descriptor allows at least some components of the control path 208, such as at least some hardware components of the control path 208, to process the multiple packet descriptors as a single data unit, thereby allowing the various components (e.g., a distributor, a reorder block, an interconnect network as described in more detail below) of the control path 208 to process multiple packets more quickly compared to systems in which packet descriptors are individually provided to the components, in an embodiment. Consequently, packet per second rate supported by the control path 208 is increased (as compared to systems in which the packet descriptors are processed individually by these components) without increasing the numbers and/or the complexity of these components, in at least some embodiments and/or scenarios.

In an embodiment, the control path 208 includes a distributor 210, a reorder block 212, a plurality of external engines 216, a packet processor 217 and an interconnect network 218. In an embodiment, the packet processor 217 is the same as or similar to the packet processor 118 of FIG. 1. In another embodiment, the packet processor 217 is a suitable packet processor different from the packet processor 108 of FIG. 1. In the embodiment illustrated in FIG. 2, the packet processor 217 includes a plurality packet processing nodes (PPNs) 220 configured to concurrently, in parallel, perform processing of respective packet descriptors to process packets associated with the packet descriptors. According to an embodiment, the PPNs 220 are configured to process packet descriptors by executing computer readable instructions stored in a non-transitory memory (not shown), and each PPN 220 is configured to perform all necessary processing (run to completion processing) of a descriptor. In other embodiments, at least some PPNs 220 are configured to perform only subsets of necessary processing of descriptors. On the other hand, the distributor 210, the reorder block 212, and the external engines 216 are implemented using application-specific integrated circuits (ASICs) or other hardware components, in an embodiment.

The distributor 210 is configured to receive packet descriptors from the descriptor generator 202 and to distribute the packet descriptors to the PPNs 220 for processing of associated packets by the PPNs 220. During processing of the packets, the PPNs 220 are configured to selectively engage the external processing engines 216 for performing particular processing operations that the external engines 216 are configured to perform. In at least some embodiments, the PPNs 220 are not configured to perform the particular processing operations that the external processing engines 216 are configured to perform. The particular processing operations that the external processing engines 106 are configured to perform are typically highly resource intensive and/or would require a relatively longer time to be performed if the operations were performed using a more generalized processor, such as a PPNs 220, in at least some embodiments and/or scenarios. In at least some embodiments and scenarios, it would take significantly longer (e.g., twice as long, ten times as long, 100 times as long, etc.) for a PPN 220 to perform a processing operation that an external processing engine 216 is configured to perform. As such, the external processing engines 216 assist PPNs 220 by accelerating at least some processing operations that would take a long time to be performed by the PPNs 220, in at least some embodiments and/or scenarios. Accordingly, the external processing engines 216 are sometimes referred to herein as "accelerator engines."

The PPNs 220 are configured to utilize the results of the processing operations performed by the accelerator engines 216 for further processing of the packets, for example to determine certain actions, such as forwarding actions, policy control actions, etc., to be taken with respect to the packets, in an embodiment. Upon completion of processing of the descriptors, the PPNs 220 provide the processed descriptors to the descriptor buffer 214 for subsequent transmission to transmission of the processed descriptors to the data path 206, in an embodiment.

Typically, order of data packets in a data flow needs to be maintained through a network device such that the order in which the packets are transmitted from the network device is the same as the order in which the packets were received by the network device. However, because processing of packets in a data flow is distributed among multiple ones of the PPNs 220, processing of the packets in the data flow is completed by the PPNs 220 in an order different than the order in which the packets were received by the network device 200, in at least some situations. Out of order completion of processing of the packets is due, for example, to variance in latency encountered by different PPNs 220 when accessing an external resource, such as external memory, an external hardware engine, etc. for performing a processing operation on a packet. In an embodiment, the reorder block 212 is configured to maintain order of at least the packets belonging to a same data flow entering the network device to ensure that these packets are transmitted from the network device in the order in which the packets were received by the network device. In particular, the reorder block 212 ensures that descriptors are transmitted from the control path 208 to the data path 206 in the same order that the descriptors were received by the control path 208 from the data path 206, in an embodiment.

As discussed above, in an embodiment, the network device 200 is configured to perform reduced sets of processing operations with respect to packets that enter the network device 200 via one or more specific ports 104. In an embodiment, the PPNs 220 are configured to execute reduced sets of instructions stored in a program memory coupled to the PPNs 220, wherein a reduced set of instructions causes a PPN 220 to perform a reduced set of processing operations to process a packet. Executing reduced sets of processing operations to process some of the packets provided for processing to the PPNs 220 generally increases maximum packet per second rate supported by the PPNs 220, in at least some embodiments. Increasing maximum packet per second rate supported by the PPNs 220 allows the network device 200 to utilize relatively fewer PPNs 220 (as compared to systems that do not utilize reduced processing) to support a certain overall packets processing rate of the packet processor 118, in an embodiment. For example, in an embodiment, thread latency associated with execution of a reduced set of instructions by a PPN 220 is half of the thread latency associated with execution of a full set of instructions by the PPNs 220, in an example embodiment. Reduced thread latency associated with execution of reduced sets of instructions reduces overall average thread latency associated with processing packets by the PPNs 220, in an embodiment. In an embodiment, the reduced average thread latency results in relatively fewer PPNs 220 needed to support a certain packet processing rate. In an embodiment in which the PPNs 220 are arranged in a plurality of PPN clusters (PPCs) configured to share various resources, such as memory resources, engine interconnect resources, etc., fewer PPNs are included in each of the clusters as compared to systems that do not utilize reduced sets of instructions to process the packets.

Similarly, in an embodiment, number of transactions between a PPN 220 and the engines 216 during processing of a packet by the PPN 220 is reduced (e.g., reduced by 50%) when a reduced set of instructions is executed to process a packet, in at least some embodiments and/or scenarios. Reducing the number of transactions for processing at least some of the packets processed by the PPNs 200 results in decreased complexity of components that support such transactions, such as the interconnect network 218, memory or memories accessed by the engines 216 to perform lookups indicated by the transactions, etc. In some embodiments, the network device 200 includes duplicate resources needed for performing processing operations associated with the transactions to support the increased rate of a specific processing operation that are included in a reduced set of processing operations, such as a forwarding operations, a metering operation, etc. For example, the network device 200 includes one or more duplicate forwarding tables to support a reduced set of processing operations that includes a forwarding operation, in an embodiment. Similarly, the network device 200 includes one or more duplicate counters to support a reduced set of processing operations that includes a counting operation, one or more duplicate metering device to support a reduced set of processing operations that includes a metering operation, etc.

In an embodiment, when the distributor 210 receives a single combined packet descriptor that represents multiple packets and contains multiple descriptors corresponding to the multiple packets, the distributor 210 provides the single packet descriptor to an available PPN 220. The PPN 220 decomposes the single packet descriptor to retrieve the packet descriptors corresponding to respective packets included in the single packet descriptor, and executes a reduced set of instructions with respect to each descriptor extracted from the combined packet descriptor. For example, in the example scenario illustrated in FIG. 2, the distributor 210 receives the combined packet descriptor 232a that includes the descriptor 230-1a corresponding to the first packet 220-1 and the descriptor 220-2a corresponding to the second packet 220-2. The distributor 210 provides the combined packet descriptor 232a, as a single data unit, to a PPN 220, in an embodiment. The PPN 220 receives the combined packet descriptor 232a from the distributor 220 and determines, for example based on a packing flag included in the packet descriptor 232a, that the packet descriptor 232a is a combined packet descriptor that represents multiple packets, in an embodiment. In response to determining that the packet descriptor 232a is a combined packet descriptor, the PPN 220 decomposes the combined packet descriptor 232a to extract the first packet descriptor 230-1a and the second packet descriptor 230-2a, in an embodiment. The PPN 220 processes the first packet descriptor 230-1a to process the first packet 220-1, and processes the second packet descriptor 230-2a to process the second packet 220-2, in an embodiment. In an embodiment, the PPN 220 executes a reduced set of instructions to perform a reduced set of processing operations to process the first packet 220-1 and the second packet 220-2. In another embodiment, the PPN 220 executes different reduced sets of instructions to perform different reduced sets of processing operations to process the first packet 220-1 and the second packet 220-2. In an embodiment, the PPN 220 completes processing of the first packet descriptor 230-1a corresponding to the first packet 220-1 before starting processing of the second packet descriptor 230-2a corresponding to the second packet 220-2. In another embodiment, the PPN 220 employs multi-threaded processing to concurrently process the first packet descriptor 230-1a corresponding to the first packet 220-1 and the second packet descriptor 230-2 corresponding to the second packet 220-2a.

In an embodiment, after processing the first packet descriptor 230-1a and the second packet descriptor 230-2a, the PPN 220 combines a processed first packet descriptor 230-1b corresponding to the first packet 220-1 and a processed second packet descriptor 230-2b corresponding to the second packet 220-2 into a single combined processed packet descriptor 232b, and provides the single combined processed packet descriptor 232b to the processed descriptor 214. In an embodiment, processing the first packet descriptor 230-1a includes modifying the packet descriptor 230-1a, for example to change one or more header bits extracted from the header of the first packet 220-1 and included in the first packet descriptor 230-1a, to add information (e.g., a forwarding decision) to the packet descriptor 230-1a, etc., in an embodiment. In this embodiment, the processed first packet descriptor 230-1b is a modified version of the first packet descriptor 230-1a. In another embodiment, the processed descriptor 230-2b is an unmodified version of the descriptor 230-2a. Similarly, processing the second packet descriptor 230-1b includes modifying the packet descriptor 230-1b, for example to change one or more header bits extracted from the header of the second packet 220-2 and included in the second packet descriptor 230-2a, to add information (e.g., a forwarding decision) to the packet descriptor 230-2*a*, etc., in an embodiment. In this embodiment, the processed second packet descriptor 230-2*b* is a modified version of the first packet descriptor 230-2*a*. In another embodiment, the processed descriptor 230-2*b* is an unmodified version of the descriptor 230-2*a*.

In an embodiment, upon providing the processed combined descriptor 232*b* to the buffer 214, the PPN 220 informs the reorder block 212 that processing of the combined packet descriptor 232*a* has been completed by the PPN 220. The packet reorder block 212 causes the single combined processed packet descriptor 232*b* to be transmitted from the buffer 214 to the data path 206 when all packet descriptors (or data units containing multiple packet descriptors) received from the data path 206 prior to the packet descriptor 232*a* have been returned to the data path 206, in an embodiment. Allowing the reorder block 212 to process two packet descriptors as a single data unit reduces the number of operations that the reorder block 212 needs to perform in order to maintain packet order. For example, only a single processing operation needs to be performed by the reorder block 212 to process a single indication from the PPN 220 that indicates completion of processing of the combined packet descriptor 232*a* to indicate completion of processing of both the first packet 220-1 and the second packet 220-2 by the PPN 220, in an embodiment. Similarly, as another example, only a single operation needs to be performed by the reorder block 212 to cause the first processed descriptor 230-1*b* and the second processed descriptor 230-2*b* to be returned to the data path 206, in an embodiment. Reducing the number of operations that the reorder block 212 needs to perform to process combined packet descriptors allows the reorder block 212 to support the higher processing rate of the PPNs 220 as a result of a reduced set of instructions executed by the PPNs 220, without increasing the size and/or the complexity of the reorder block 212, in at least some embodiments.

In an embodiment, the processed combined packet descriptor 232*b* is provided to the descriptor unpacking unit 205. The descriptor unpacking unit 205 decomposes the processed combined packet descriptor 232*b* to extract the first processed packet descriptor 230-1*b* and the second processed packet descriptor 230-2*b*, in an embodiment. The descriptor unpacking unit 205 writes the first processed packet descriptor 230-1*b* and the second processed packet descriptor 230-2*b* to the buffer 110 for subsequent transmission of the associated first packet 220-1 and the second packet 220-2 from one or more appropriate ports 104, in an embodiment.

In an embodiment, the network device 200 supports unicast and multicast traffic. The descriptor packing unit 204 is configured to combine a packet descriptor corresponding to a unicast packet with a packet descriptor corresponding to a multicast packet into a single combined packet descriptor in some situations, in an embodiment. The descriptor packing unit 204 is configured to combine a packet descriptor corresponding to two or more multi-cast packets in other situations, in an embodiment. In an embodiment, when the packet processor 217 receives a combined packet descriptor that includes a first packet descriptor corresponding to a unicast packet and a second packet descriptor corresponding to a multicast packet, the packet processor 217 performs ingress and egress processing of the first packet descriptor, and performs only ingress processing of the second packet descriptor. In an embodiment, the packet processor 217 determines a destination port 104 for egressing the first (unicast) packet, and determines a loopback port for processing a second instance of the second (multi-cast) packet.

After the descriptor unpacking unit 205 decomposes a processed combined packet descriptor corresponding to the first packet and the second packet, the packet descriptor corresponding to the multicast packet is looped back to the control plane 208 for processing of a next instance of the multicast packet. In an embodiment, loopback of packet descriptors corresponding to multicast packets to the control plane 208 bypasses the descriptor packing unit 204. In other words, combining descriptors corresponding to multicast packets that are looped back to the control path 208 is not performed, in this embodiment.

In some embodiments, congestion caused by a higher ingress packet rate of the data path 206 as compared to a packet rate that is supported by the control path 208 results in oversubscription of the control path 208. In an embodiment, the network device 200 is configured to assign oversubscription priorities to received packets and, when congestion occurs, to drop one or more lower priority packets. In an embodiment, when the descriptor packing unit 204 combines multiple (e.g., two, three, etc.) packet descriptors corresponding to different packets, and at least one of the packet descriptors corresponds to a higher priority packet, the descriptor packing unit 204 assigns the higher priority to the combined descriptor that represents the multiple packets. In this case, if a packet descriptor corresponding to a lower priority packet is combined with a packet descriptor corresponding to a higher priority packet, the lower priority packet is treated as a higher priority packet for the purpose of reducing congestion in the network device 200, in an embodiment.

In an embodiment, the network device 200 supports "store and forward" processing and "cut-through" processing. Generally, in store and forward packet processing, the descriptor generator 202 passes a packet descriptor to the control path 208 after the associated packet has been fully received and buffered in the buffer 110. In cut-through processing, the descriptor generator 202 generates a "cut-through" descriptor corresponding to the packet before the associated packet has been entirely received by the network device 200 and buffered in the buffer 110, and passes the "cut-through" descriptor to the control path 206. The network device 200 begins transmission of the packet using a forwarding decision made by the control path 208 based on the cut-through descriptor and before the network device 200 completes reception of the entire packet, in at least some embodiments and/or scenarios. In some embodiments, in addition to the cut-through header generated for a packet, the descriptor generator 202 generates a second descriptor (and "store and forward" descriptor) corresponding to the packet after the entire packet has been received by the network device 200, and passes the second descriptor to the control path 208. The control path 208 utilizes the second packet descriptor to make one or more additional (e.g., non-forwarding) decisions with respect to the packet. The one or more non-forwarding operations generally determine and/or utilize information that can only be ascertained (or can only be accurately ascertained) after the full packet is available in the buffer, in an embodiment. In various embodiments, for example, the non-forwarding operation(s) include a counting operation that determines a byte count of the full packet, a mirroring operation that utilizes knowledge of whether the full packet contains any errors, etc.

In an embodiment, when a cut-through packet descriptor is generated for a packet, the descriptor packing unit 204 does not perform packing of the cut-through descriptor so as not to delay or add latency to processing of the cut-through packet. Rather, the cut-through packet descriptor is transferred individually to the control path 208, in this embodiment. On the other hand, when a store and forward packet descriptor is generated for the packet, the descriptor packing unit 204 performs packing of the store and forward descriptor to combine the store and forward descriptor with one or more other descriptors in at least some situations, in an embodiment.

Figure 3:
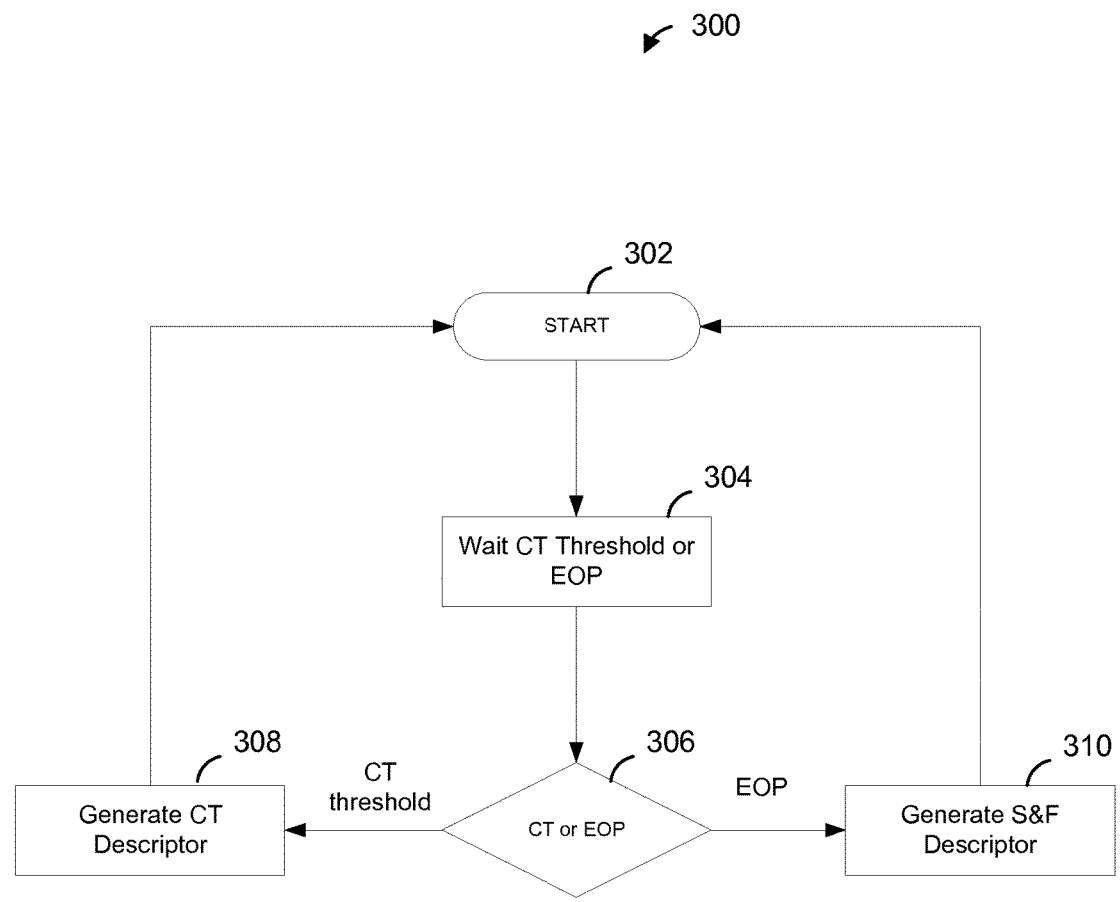
FIG. 3 is a flow diagram of an example technique for generating packet descriptors, according to an embodiment.

FIG. 3 is a flow diagram of an example technique 300 for generating packet descriptors, according to an embodiment. In an embodiment, the technique 300 is implemented by the network device 200 of FIG. 2. For example, the technique 300 is implemented by the descriptor generator 210 of the network device 200, in an embodiment. In other embodiments, the technique 300 is implemented by another component of the network device 200 or is implemented by a suitable network device other than the network device 200. For ease of explanation, the technique 300 is described with reference to the network device 200 of FIG. 2.

At block 302, the descriptor generator 210 begins receiving a packet, or a header corresponding to a packet, that is being received by the network device 200 via a port 104. After beginning reception of the packet or the packet header at block 402, the descriptor generator 210 waits for a predetermined period of time. For example, the descriptor generator waits for an amount of time that corresponds to reception of the first x number of bytes (e.g., first 128 bytes, for example) of the packet or of the packet header, in an embodiment. At block 306, the descriptor generator 210 determines whether a cut through descriptor or a store and forward descriptor should be generated. If it is determined at block 306 that a cut-through descriptor should be generated and that the packet has not yet been entirely received by the network device 200, then the descriptor generator 210 generates a cut-through descriptor at block 308. On the other hand, if it is determined 206 that a store and forward packet descriptor should be generated for the packet and that the entire packet has been receive by the network device 200 and buffered in the buffer 118, then a store and forward packet descriptor is generated at block 310.

Figure 4:
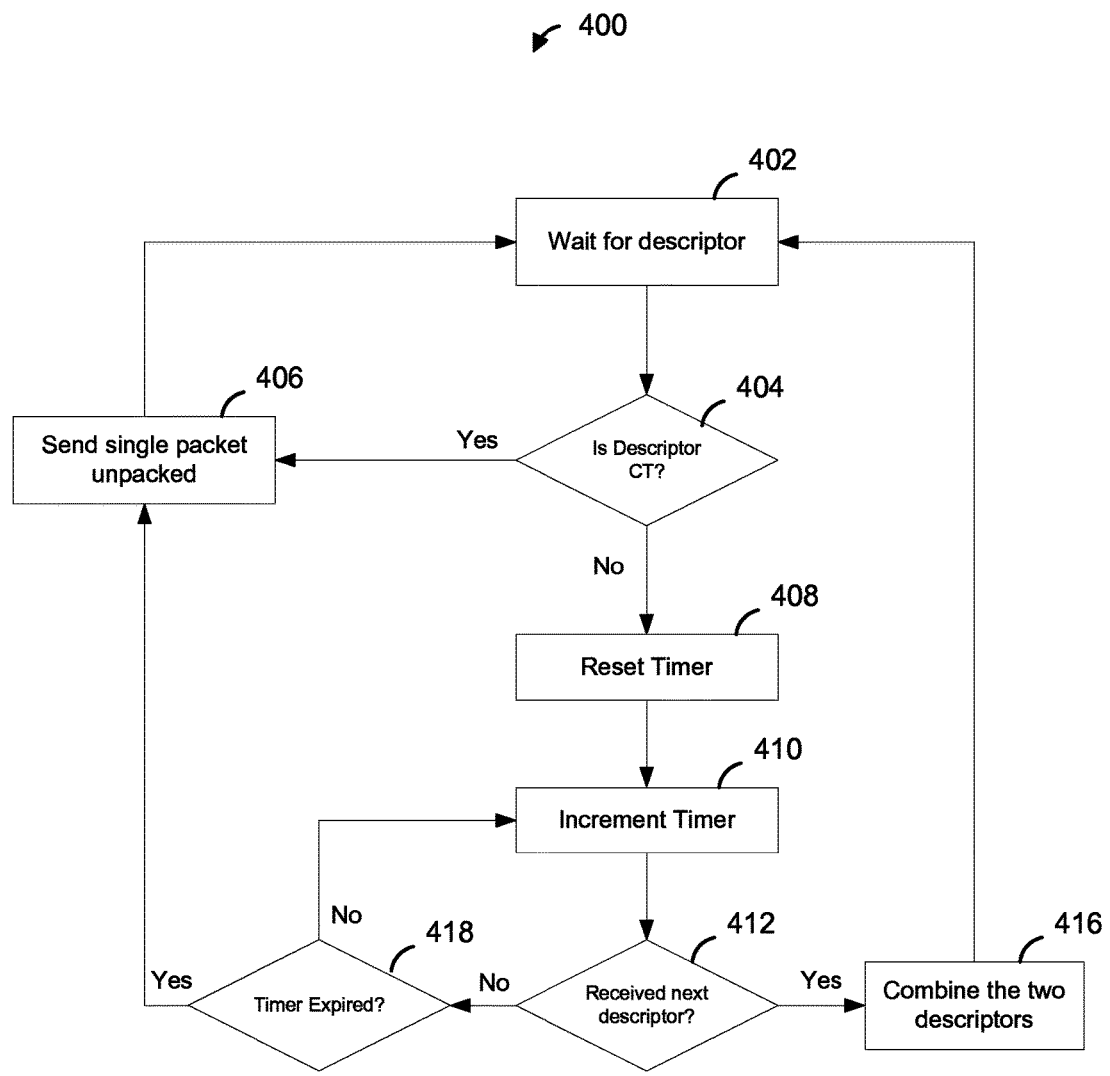
FIG. 4 is a flow diagram of an example technique for determining whether a packet descriptor is to be sent for processing as an individual single packet descriptor or as part of a data unit that combines multiple packet descriptors, according to an embodiment.

FIG. 4 is a flow diagram of an example technique 400 for determining whether a packet descriptor is to be sent for processing as an individual single packet descriptor or as part of a data unit that combines multiple packet descriptors, according to an embodiment. In an embodiment, the technique 400 is implemented by the network device 200 of FIG. 2. For example, the technique 400 is implemented by the descriptor packing unit 204 of FIG. 2, in an embodiment. In other embodiments, the technique 400 is implemented by another component of the network device 200 or is implemented by a suitable network device other than the network device 200. For ease of explanation, the technique 400 is described with reference to the network device 200 of FIG. 2.

At a block 402, the descriptor packing unit 204 awaits reception of a packet descriptor. A block 404, after receiving at least a portion of a descriptor at block 302, the descriptor packing unit 204 determines whether the descriptor corresponds to a cut through packet. For example, the descriptor packing unit 204 determines whether the descriptor corresponds to a cut-through packet based on an indication included in the descriptor, in an embodiment. If it is determined at block 404 that the descriptor corresponds to a cut-through packet, then the technique 400 continues at block 406, at which the descriptor is sent to the control path 216 as a single packet descriptor. Then the technique 400 returns to block 402, at which the descriptor packing unit awaits for a next descriptor.

On the other hand, if it is determined at block 404 that the descriptor does not correspond to a cut-through packet, then the technique 400 continues at block 408. At block 408, the descriptor packing unit 204 resets (e.g., sets to a value of zero) a timer used to measure a time gap between reception of two consecutive descriptors. At block 410, the timer set at block 408 is incremented. Then, at block 412, it is determined whether the next consecutive descriptor has yet been received by the descriptor packing unit 204. If it is determined at block 412 that the next packet descriptor has been received, then the technique 400 continues at block 416 at which the descriptor packing unit combines the two consecutively received packet descriptors into a single data unit. The packet descriptor generator 210 then transmits the data unit that includes the two consecutively received packet descriptors to the control path 206 for processing by the components of the control path 206, in an embodiment.

If, on the other hand, it is determined at block 412 that the next packet descriptor has not yet been received by the descriptor packing unit 204, then the technique continues at block 418. At block 418, it is determined whether the timer set at block 410 has expired. For example, the descriptor packing unit 204 compares the current value of the timer to a threshold value (e.g., a value corresponding to reception of a certain number of byte, such as 128 bytes, for example), and determines that the timer has expired if the current timer value exceeds the threshold value, in an embodiment. If the timer has expired, then the technique continues at block 406, at which the packet descriptor is sent to the control path 216 as a single packet descriptor. If it is determined at block 418 that the timer has not yet expired, then the technique 400 continues at block 410, at which the timer is again incremented. Blocks 410, 412 and 418 are repeated until either (i) it is determined at block 418 that the timer has expired, in which case the packet descriptor is sent to the control path 206 as a single packet descriptor, or (ii) it is determined at block 412 that a next packet descriptor has been received before expiration of the timer, in which case the two consecutively received packet descriptors are combined into a single data unit, and the single data unit is then sent to the control path 206, in an embodiment.

Figure 5:
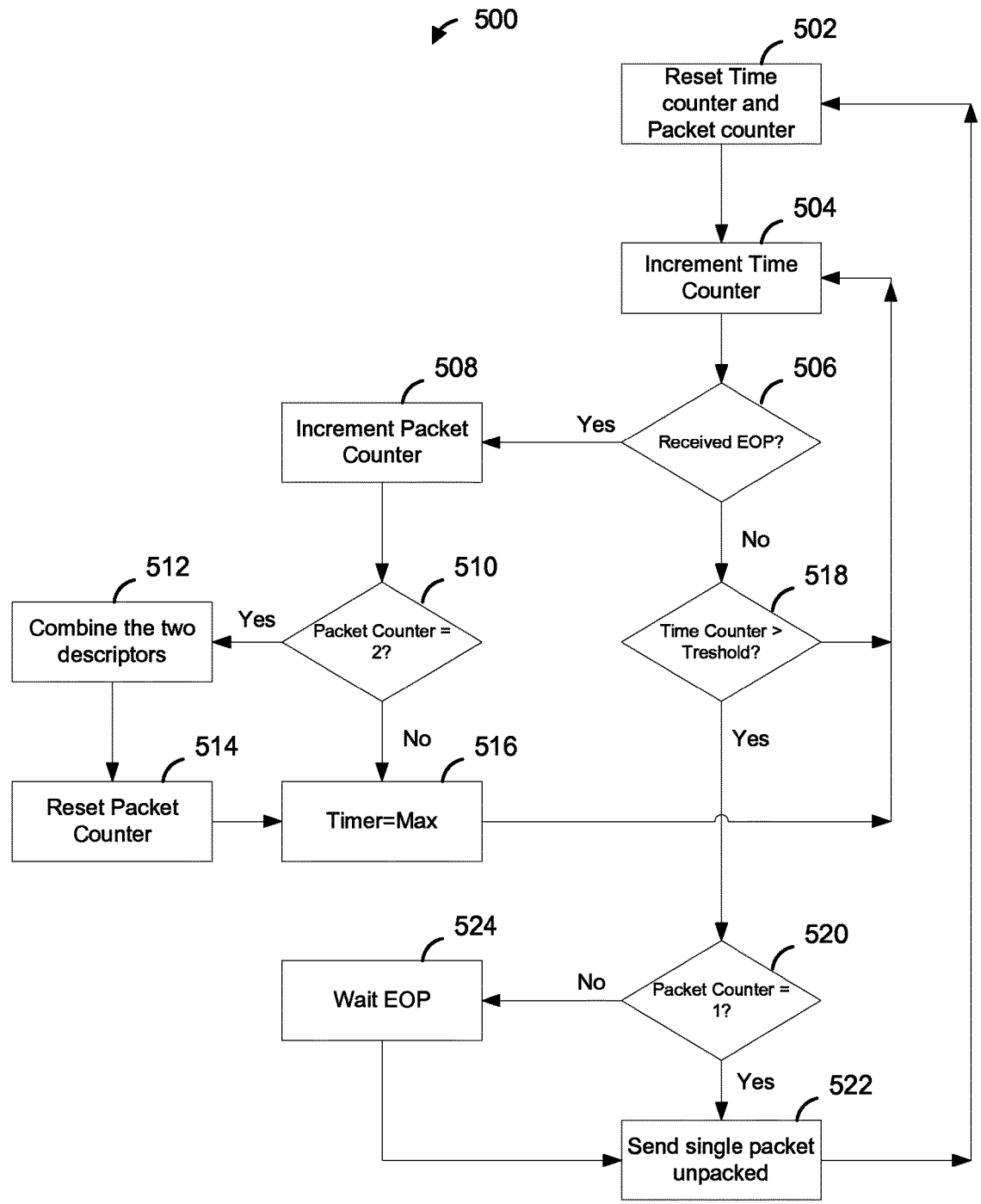
FIG. 5 is a flow diagram of an example technique for determining whether a packet descriptor is to be sent for processing as an independent single packet descriptor or as part of a data unit that combines multiple packet descriptors, according to another embodiment.

FIG. 5 is a flow diagram of an example technique 500, according to an embodiment. In an embodiment, the technique 500 is implemented to determine whether a packet descriptor should be combined with another packet descriptor or should be sent to a control path individually to reduce latency associated with combining multiple packet descriptors. In an embodiment, the technique 500 is implemented by the network device 200 of FIG. 2. For example, the technique 500 is implemented by the descriptor generator 202 of the network device 200, in an embodiment. In other embodiments, the technique 500 is implemented by another component of the network device 200 or is implemented by a suitable network device other than the network device 200. For ease of explanation, the technique 500 is described with reference to the network device 200 of FIG. 2.

At block 502, a time counter and a packet counter are reset. In an embodiment, resetting the time counter and the packet counter at block 502 comprises setting the time counter and the packet counter to a value of zero. At block 504, the time counter is incremented. At block 506, it is determined whether an end of packet has been received. If it is determined at block 506 that the end of packet has been received, then the technique 500 continues at block 508, at which the packet counter is incremented. Then, at block 510, it is determined whether the packet counter is equal to two. In other words, it is determined at block 510 whether the end of packet detected by block 506 corresponds to a second packet consecutively received by the packet descriptor generator 202. If it is determined at block 510 that the packet counter is equal to two, then two descriptors corresponding to the two packets consecutively received by the descriptor generator 202 are combined into a single combined descriptor at block 512. Then, at block 514, the packet counter is reset (e.g., set to a value of zero), and at block 516, the time counter is set to a maximum value (e.g., a time value corresponding to receiving 128 bits). On the other hand, if it is determined at block 510 that the packet counter is not equal to two (e.g., if the end of packet detected at block 506 corresponds to only a first packet), then the technique 500 follows directly to block 516, at which the time counter is set to the maximum value. In any event, after block 516, the technique 500 returns to block 504, at which the time counter is incremented.

Returning to block 506, if it is determined that the end of packet has not been received, then the technique 500 continues to block 518, at which the time counter is compared to a threshold value (e.g., a value corresponding to reception of a certain number of byte, such as 128 bytes, for example). If the time counter exceeds the threshold, then the technique 500 continues at block 520, at which it is determined whether the packet counter is equal to 1. If it is determined at block 520 that the packet counter is equal to one, then at a block 522 a packet descriptor corresponding to the one received packet is transmitted to the control path 208 at a single packet descriptor. If it is determined at block 520 that the packet counter is not yet equal to 1 (e.g., the packet counter is equal to zero), then the technique 500 continues at block 524, at which the descriptor generator 202 awaits reception of end of packet. When the end of packet has been received, the technique 500 follows to the block 522, at which a packet descriptor corresponding to the single packet is transmitted to the control path 208 as a single packet descriptor. After block 522, the technique 500 restarts at block 502, in an embodiment.

Figure 6:
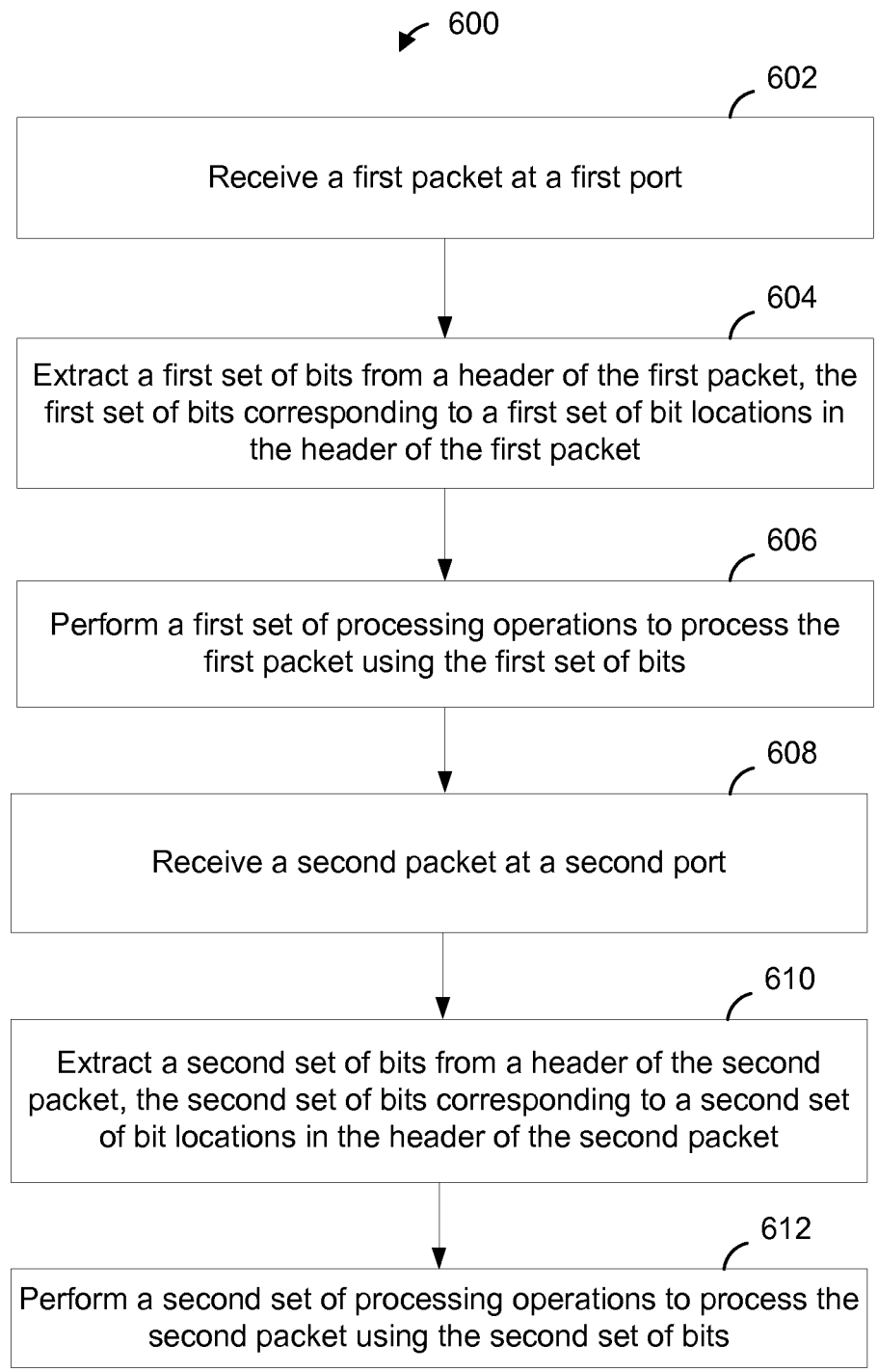
FIG. 6 is a flow diagram of an example method for processing packets, according to an embodiment.

FIG. 6 is a flow diagram of an example method 600 for processing packets in a network device, according to an embodiment. In an embodiment, the network device 100 of FIG. 1 implements the method 600. In some embodiments, the method 600 is implemented by the network device 200. The method 600 is discussed with reference to FIG. 2 merely for explanatory purposes. In other embodiments, the method 600 is implemented by a suitable network device different than the network device 100 (FIG. 1) and/or the network device 200 (FIG. 2).

At block 602, a first packet is received at a first port of the network device. In an embodiment, the first port is a network port that coupled the network device to a network. At block 604, a first set of bits is extracted from a header of the first packet received at block 602. In an embodiment, the first set of bits corresponds to a first set of bit locations in the header of the first packet. In an embodiment, the first set of bits corresponds to a first set of header fields in the header of the first packet.

At block 606, a first set of processing operations is performed to process the first packet using the first set of bits extracted from the header of the first packet at block 604. In an embodiment, the first set of processing operations is a reduced set of packet processing operations that includes a subset of packet processing operations that the network device is configured to perform. For example, in an embodiment, the first set of processing operations includes only processing operations related to forwarding of packets.

At block 608 a second packet is received at a second port of the network device. The second port of the network device is different from the first port at which the first packet is received at block 602, in an embodiment. In an embodiment, the second port is an uplink port that couples the network device to another network device, such as a switching device in a multi-stage switching system.

At block 610, a second set of bits is extracted from a header of the second packet. In an embodiment, the second set of bits corresponds to a second set of bit locations in the header of the second packet. In an embodiment, the second set of bits locations includes at least some one bit location not included in the first set of bit locations corresponding to the first set of bits extracted from the header of the first packet at block 604. In an embodiment, the second set of bits corresponds to a second set of header field in the header of the second packet. In an embodiment, the second set of header fields includes at least one header field not included in the first set of header fields corresponding to the first set of bits extracted from the header of the first packet at block 604. As an example, the first set of header fields includes one or more header fields relevant to forwarding, such as one or more of a forwarding tag field, a source address field, and a destination address field, in an embodiment. On the other hand, the second set of header fields includes at least one header field that is not related to forwarding and not included in the first set of header fields, such as an Ether-type field or an error checksum field, for example, in this embodiment.

At block 612, a second set of processing operations is performed to process the second packet using the second set of bits extracted from the header of the second packet at block 604. In an embodiment, the second set of processing operations includes a full set of packet processing operations that the network device is configured to perform. In an embodiment, the second set of processing operations includes (i) one or more processing operations related to forwarding of packets and (ii) at least one additional processing operation not related to forwarding of packets.

Figure 7:
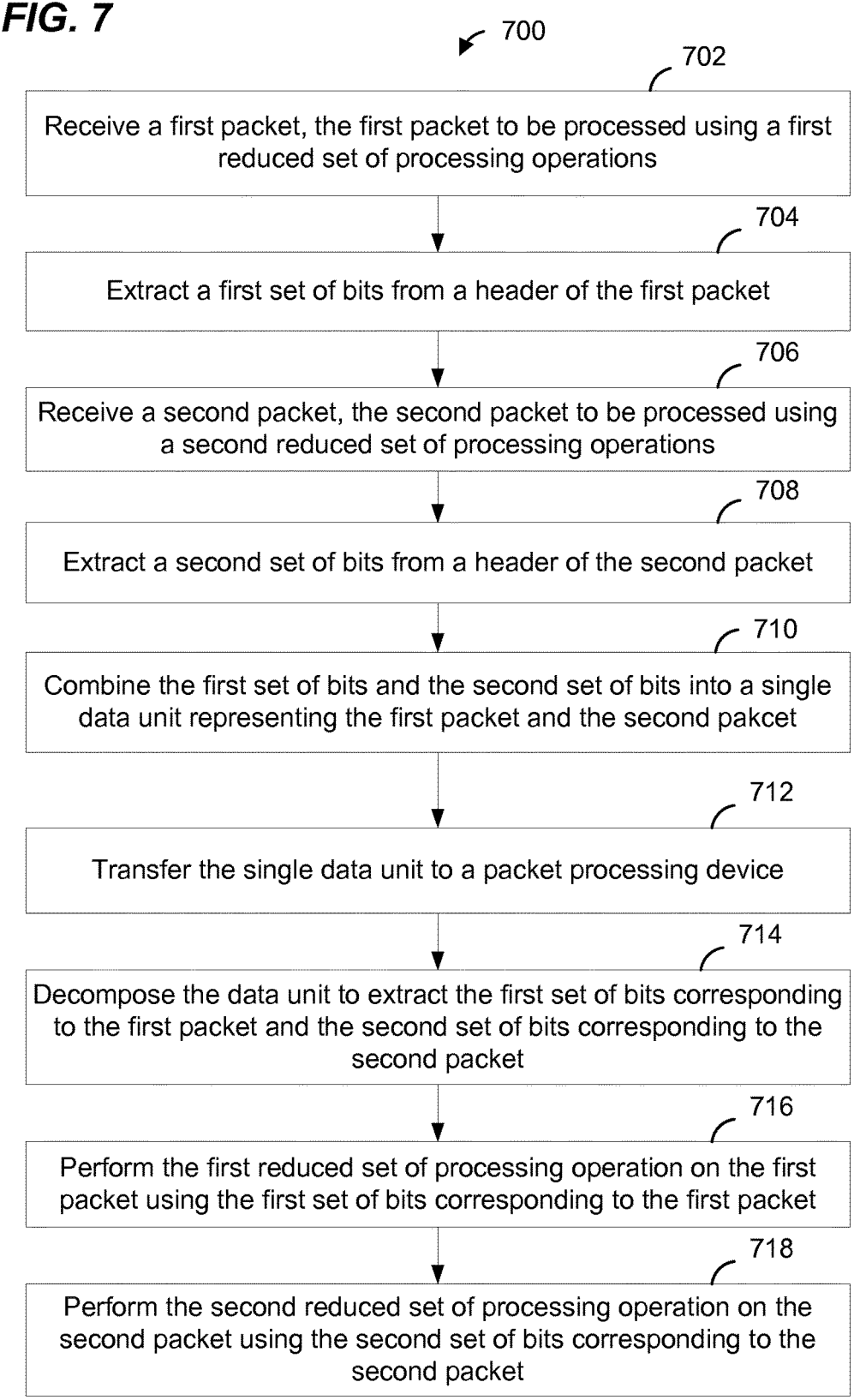
FIG. 7 is a flow diagram of an example method for processing packets, according to another embodiment.

FIG. 7 is a flow diagram of an example method 700 for processing packets, according to another embodiment. In an embodiment, the network device 100 of FIG. 1 implements the method 700. In some embodiments, the method 700 is implemented by the network device 200. The method 700 is discussed with reference to FIG. 2 merely for explanatory purposes. In other embodiments, the method 700 is implemented by a suitable network device different than the network device 100 (FIG. 1) and/or the network device 200 (FIG. 2).

At block 702, a first packet is received at a port of the network device. In an embodiment, the first packet is to be processed using a first reduced set of processing operations. At block 704, a first set of bits is extracted from header of a first packet.

At block 706, a second packet is received at the port of the network device. In an embodiment, the second packet is to be processed using a second reduced set of processing operations. In an embodiment, the second reduced set of processing operation is the same as the first set of processing operations. In another embodiment, the second set of processing operations is different than the first reduced set of processing operations. At block 708, a second set of bits is extracted from a header of the second packet.

At block 710, the first set of bits extracted from the header of the first packet at block 704 and the second set of bits extracted from the header of the second packet at block 708 are combined into a single data unit that represents the first packet and the second packet. For example, the first set of bits extracted from the header of the first packet at block 704 and the second set of bits extracted from the header of the second packet at block 708 are combined into a single descriptor that represents the first packet and the second packet.

At block 712, the single data unit that includes the first set of bits the first set of bits extracted from the header of the first packet and the second set of bits extracted from the header of the second packet is transferred to a packet processing device. At block 714, the single data unit is decomposed at the packet processing device to extract the first set of bits corresponding to first packet and the second set of bits corresponding to the second packet. At block 716, the first reduced set of processing operations is performed to process the first packet using the first set of bits corresponding to the first packet. At block 718 the second reduced set of processing operations is performed to process the second packet using the second set of bits corresponding to the second packet.

In an embodiment, a method for processing packets in a network device includes receiving a first packet at a first port of the network device, extracting a first set of bits from a header of the first packet, the first set of bits corresponding to a first set of bit locations in the header of the first packet, and performing a first set of processing operations to process the first packet using the first set of bits extracted from the header of the first packet. The method also includes receiving a second packet at a second port of the network device, the second port being different from the first port, extracting a second set of bits from a header of the second packet, the second set of bits corresponding to a second set of bit locations in the header of the second packet, wherein the second set of bit locations includes at least one bit location not included in the first set of bit locations, and performing a second set of processing operations to process the second packet using the second set of bits extracted from the header of the second packet, wherein the second set of processing operations includes at least one processing operation not included in the first set of processing operations.

In other embodiments, the method includes any one of, or any combination of one or more of, the following features.

The first set of processing operations includes only processing operations related to forwarding of packets.

The second set of processing operations includes (i) one or more processing operations related to forwarding of packets and (ii) at least one additional processing operation not related to forwarding of packets.

The second set of processing operations is a full set of processing operations that the network device is configured to perform and wherein the first set of processing operations is a reduced set of processing operations that includes a subset of the full set of processing operations.

Receiving the first packet at the second port of the network device comprises receiving the second packet at an uplink port that couples the network device to a downstream switching device in a multi-stage switching system.

Receiving the second packet at the second port comprises receiving the second packet at a network port that couples the network device to a network.

In another embodiment, a network device comprises a plurality of ports. The network device also comprises a packet descriptor generator configured to generate a first data structure corresponding to a first packet received via a first port of the plurality of ports, wherein the first data structure includes a first set of bits extracted from a header of the first packet, the first set of bits corresponding to a first set of bit locations in the header of the first packet. The packet descriptor is also configured to generate a second data structure corresponding to a second packet received via a second port of the plurality of ports, the second port being different from the first port, wherein the second data structure includes a second set of bits corresponding to a second set of bit locations in the second header, and wherein the second set of bit locations includes at least one bit location not included in the first set of bit locations. The network device also comprises a packet processor configured to perform a first set of processing operations to process the first packet using the first data structure corresponding to the first packet, and perform a second set of processing operations to process the second packet using the second data structure corresponding to the second packet, wherein the second set of processing operations includes at least one processing operations not included in the first set of processing operations.

In other embodiments, the network device comprises any one of, or any combination of one or more of, the following features.

The packet processing device is configured to perform the first set of processing operations to perform only processing operations related to forwarding of packets.

The packet processing device is configured to perform the second set of processing operations to perform (i) one or more processing operations related to forwarding of packets and (ii) at least one additional processing operation not related to forwarding of packets.

The packet processing device is configured to perform the second set of processing operations to perform a full set of processing operations that the network device is configured to perform and wherein the first set of processing operations is a reduced set of processing operations that includes a subset of the full set of packet processing operations.

The first port is an uplink port that couples the network device to a downstream switching device in a multi-stage switching system.

The second port is a network port to couple the network device to a network.

In yet another embodiment, a method for processing packets in a network device includes receiving a first packet at a port of the network device, the first packet to be processed using a first reduced set of processing operations, and extracting a first set of bits from a header of the first packet. The method also includes receiving a second packet at the port of the network device, the second packet to be processed using a second reduced set of processing operations, and extracting a second set of bits from a header of the second packet. The method additionally includes combining the first set of bits and the second set of bits into a combined single data unit representing the first packet and the second packet, and transferring the combined single data unit representing the first packet and the second packet to a packet processing device. The method further includes decomposing, at the packet processing device, the single data unit to extract the first set of bits corresponding to the first packet and the second set of bits corresponding to the second packet, performing the first reduced set of processing operations to process the first packet using the first set of bits corresponding to the first packet, and performing the second reduced set of processing operations to process the second packet using the second set of bits corresponding to the second packet.

In other embodiments, the method includes any one of, or any combination of one or more of, the following features.

The method further includes, after performing the first reduced set of processing operations to process the first packet and performing the second reduced set of processing operations to process the second packet, recombining the first set of bits corresponding to the first packet and the second set of bits corresponding to the second packet into a single data unit representing a processed first packet and a processed second packet, and transferring the single data unit representing the processed first packet and the processed second packet to a processed packet buffer.

The first reduced set of processing operations includes a first subset of a full set of packet processing operations that the network device is configured to perform.

The second reduced set of processing operations includes a second subset of the full set of packet processing operations that the network device is configured to perform.

The first subset of the processing operations includes the same processing operations as the first subset of processing operations.

The full set of processing operations includes (i) the one or more processing operations related to forwarding packets and (ii) at least one additional processing operation not related for forwarding packets, and wherein each of (i) the first subset of processing operations and (ii) the second subset of processing operations includes only one or more processing operations related to forwarding packets.

Combining the first set of bits and the second set of bits into the single data unit comprises combining the first set of bits and the second set of bits only if a size of the first packet and a size of the second packet is below a threshold.

Combining the first set of bits and the second set of bits into the single data unit comprises combining the first set of bits and the second set of bits only if a time gap between receiving the first packet and receiving the second packet is below a threshold.

In still another embodiment, a network device comprises a plurality of ports. The network device also comprises a packet processing device configured to process packets received via the at least one port. The network device further comprises a descriptor generator configured to extract a first set of bits from a header of a first packet received at a port of the plurality of ports, the first packet to be processed using a reduced set of processing operations, and extract a second set of bits from a header of a second packet received at the port of the plurality of ports, the second packet to be processed using a second reduced set of processing operations. The descriptor generator is additionally configured to combine the first set of bits and the second set of bits into a single data unit representing the first packet and the second packet, and transfer the single data unit representing the first packet and the second packet to the packet processing device. The packet processing device is configured to decompose the single data unit to extract the first set of bits corresponding to the first packet and the second set of bits corresponding to the second packet, perform the first reduced set of instructions to process the first packet using the first set of bits corresponding to the first packet, and perform the second reduced set of processing operations to process the second packet using the second set of bits corresponding to the second packet.

In other embodiments, the network device comprises any one of, or any combination of one or more of, the following features.

The packet processing device is further configured to, after performing the first reduced set of processing operations to process the first packet and performing the second reduced set of processing operations to process the second packet, recombine the first set of bits corresponding to the first packet and the second set of bits corresponding to the second packet into a single data unit representing processed first packet and processed second packet, and transfer the single data unit representing the processed first packet and the processed second packet to a processed packet buffer.

The first reduced set of processing operations includes a first subset of a full set of packet processing operations that the network device is configured to perform to process packets.

The second reduced set of processing operations includes a second subset of the full set of packet processing operations that the network device is configured to perform.

The first subset of the processing operations includes the same processing operations as the first subset of processing operations.

The full set of processing operations includes (i) the one or more processing operations related to forwarding packets and (ii) at least one additional processing operation not related for forwarding packets, and wherein each of (i) the first subset of processing operations and (ii) the second subset of processing operations includes only one or more processing operations related to forwarding packets.

The descriptor generator is configured to combine the first set of bits and the second set of bits into the single data unit only if a size of the first packet and a size of the second packet is below a threshold.

The descriptor generator is configured to combine the first set of bits and the second set of bits only if a time gap between receiving the first packet and receiving the second packet is below a threshold.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

While the present invention has been described with reference to specific examples, which are intended to be illustrative only and not to be limiting of the invention, changes, additions and/or deletions may be made to the disclosed embodiments without departing from the scope of the invention. For example, one or more portions of methods or techniques described above may be performed in a different order (or concurrently) and still achieve desirable results.

What is claimed is:

1. A method for processing packets in a network device, the method comprising:
receiving packets by the network device, including
receiving a first packet at a first port of the network device, wherein the first packet includes a first header;
receiving a second packet at a second port of the network device, wherein the second packet includes a second header, and wherein the second port is different from the first port;
extracting different sets of bits from the packets depending on the port at which the packets were received by the network device, including
based on receiving the first packet at the first port, extracting a first set of bits from the first header of the first packet, the first set of bits corresponding to a first set of bit locations in the first header of the first packet, wherein the first set of bits is a reduced set of bits that does not include all bits in the first header of the first packet, and
based on receiving the second packet at the second port, extracting a second set of bits from the second header of the second packet, the second set of bits corresponding to a second set of bit locations in the second header of the second packet, wherein the second set of bit locations includes at least one bit location not included in the first set of bit locations, and wherein the second set of bits includes at least one type of header data not included in the first set of bits;
generating a first packet descriptor corresponding to the first packet, including generating the first packet descriptor to include the first set of bits extracted from the first header of the first packet;
generating a second packet descriptor corresponding to the second packet, including generating the second packet descriptor to include the second set of bits extracted from the second header of the second packet, wherein the second packet descriptor is of a larger size than the first packet descriptor, the larger size to include the at least one type of header data included in the second set of bits and not included in the first set of bits;
performing a first set of processing operations to process the first packet using the first set of bits included in the first packet descriptor corresponding to the first packet; and
performing a second set of processing operations to process the second packet using the second set of bits included in the second packet descriptor corresponding to the second packet, wherein the second set of processing operations includes at least one processing operation not included in the first set of processing operations.

2. The method of claim 1, wherein the first set of processing operations includes only processing operations related to forwarding of packets.

3. The method of claim 2, wherein the second set of processing operations includes (i) one or more processing operations related to forwarding of packets and (ii) at least one additional processing operation not related to forwarding of packets.

4. The method of claim 1, wherein the second set of processing operations is a full set of processing operations that the network device is configured to perform and wherein the first set of processing operations is a reduced set of processing operations that includes a subset of the full set of processing operations.

5. The method of claim 1, wherein:
receiving the first packet at the first port of the network device comprises receiving the first packet at an uplink port that couples the network device to a downstream switching device in a multi-stage switching system; and
receiving the second packet at the second port of the network device comprises receiving the second packet at a network port that couples the network device to a network.

6. The network device of claim 5, wherein:
the first port is an uplink port that couples the network device to a downstream switching device in a multi-stage switching system;
the second port is a network port to couple the network device to a network.

7. The method of claim 1, wherein
the second set of processing operations includes one or more of forwarding of packets, metering of packets, monitoring of packets, and security processing of packets,
the first set of processing operations includes a subset of the one or more of forwarding of packets, metering of packets, monitoring of packets, and security processing of packets, and
performing the second set of processing operations to process the second packet includes performing at least one of the one or more of forwarding of packets, metering of packets, monitoring of packets, and security processing of packets using the at least one type of data included in the second set of bits in the second packet descriptor and not included in the first set of bits in the first packet descriptor.

8. The method of claim 1, wherein performing the second set of processing operations to process the second packet includes performing at least one processing operation in the second set of processing operations using the at least one type of data included in the second set of bits in the second packet descriptor and not included in the first set of bits in the first packet descriptor.

9. A network device, comprising:
a plurality of ports;
a packet descriptor generator configured to extract sets of bits from packets received via the ports, the different sets of bits extracted depending on the port at which the packets were received, wherein the packet descriptor generator is configured to
generate a first data structure corresponding to a first packet received via a first port of the plurality of ports, wherein the first packet includes a first header, and wherein the first data structure includes a first set of bits extracted from the first header of the first packet based on receiving the first packet at the first port, the first set of bits corresponding to a first set of bit locations in the first header of the first packet, wherein the first set of bits is a reduced set of bits that does not include all bits in the first header of the first packet, and
generate a second data structure corresponding to a second packet received via a second port of the plurality of ports, the second port being different from the first port, wherein the second packet includes a second header, and wherein the second data structure includes a second set of bits extracted from the second header of the second packet based on receiving the second packet at the second port, the second set of bits corresponding to a second set of bit locations in the second header of the second packet, wherein
i) the second set of bit locations includes at least one bit location not included in the first set of bit locations, ii) the second set of bits includes at least one type of header data not included in the first set of bits, and iii) the second data structure is of a larger size than the first data structure, the larger size to include the at least one type of header data included in the second set of bits and not included in the first set of bits; and a packet processor configured to perform a first set of processing operations to process the first packet using the first data structure corresponding to the first packet, and perform a second set of processing operations to process the second packet using the second data structure corresponding to the second packet, wherein the second set of processing operations includes at least one processing operations not included in the first set of processing operations.

10. The network device of claim 9, wherein the packet processing device is configured to perform the first set of processing operations to perform only processing operations related to forwarding of packets.

11. The network device of claim 10, wherein the packet processing device is configured to perform the second set of processing operations to perform (i) one or more processing operations related to forwarding of packets and (ii) at least one additional processing operation not related to forwarding of packets.

12. The network device of claim 11, wherein the packet processing device is configured to perform the second set of processing operations to perform a full set of processing operations that the network device is configured to perform, and wherein the first set of processing operations is a reduced set of processing operations that includes a subset of the full set of packet processing operations.

13. The network device of claim 9, wherein the second set of processing operations includes one or more of forwarding of packets, metering of packets, monitoring of packets, and security processing of packets, the first set of processing operations includes a subset of the one or more of forwarding of packets, metering of packets, monitoring of packets, and security processing of packets, and the packet processor is configured to perform at least one of the one or more of forwarding of packets, metering of packets, monitoring of packets, and security processing of packets to process the second packet using the at least one type of data included in the second set of bits in the second packet descriptor and not included in the first set of bits in the first packet descriptor.

14. The network device of claim 9, wherein the packet processor is configured to perform at least one processing operation in the second set of processing operations to process the second packet using the at least one type of data included in the second set of bits in the second packet descriptor and not included in the first set of bits in the first packet descriptor.

* * * * *